US012811292B2

(12) United States Patent
Okita et al.

(10) Patent No.: US 12,811,292 B2
(45) Date of Patent: Nov. 24, 2026

(54) DRIVING METHOD OF INTELLIGENT REFLECTING SURFACE

(71) Applicant: Japan Display Inc., Tokyo (JP)

(72) Inventors: Mitsutaka Okita, Tokyo (JP); Shinichiro Oka, Tokyo (JP); Daiichi Suzuki, Tokyo (JP); Hiromi Matsuno, Saitama (JP); Takuya Ohto, Saitama (JP); Yoshiaki Amano, Saitama (JP)

(73) Assignee: JAPAN DISPLAY INC., Tokyo (JP)

( * ) Notice: Subject to any disclaimer, the term of this patent is extended or adjusted under 35 U.S.C. 154(b) by 49 days.

(21) Appl. No.: 19/003,062

(22) Filed: Dec. 27, 2024

(65) Prior Publication Data

US 2025/0149786 A1 May 8, 2025

Related U.S. Application Data

(63) Continuation of application No. PCT/JP2023/018325, filed on May 16, 2023.

(30) Foreign Application Priority Data

Jul. 8, 2022 (JP) ................................ 2022-110314

(51) Int. Cl.
*H01Q 3/44* (2006.01)
*H01Q 3/46* (2006.01)
*H01Q 15/14* (2006.01)

(52) U.S. Cl.
CPC .................................... *H01Q 3/46* (2013.01)

(58) Field of Classification Search
CPC ............ H01Q 3/44; H01Q 3/46; H01Q 15/14
See application file for complete search history.

(56) References Cited

U.S. PATENT DOCUMENTS 10,720,712 B2 * 7/2020 Foo ......................... H01Q 1/36
2020/0161759 A1 * 5/2020 Bulja .................... H01Q 9/045
2022/0013903 A1 * 1/2022 Evans .................... H01P 3/006

FOREIGN PATENT DOCUMENTS

JP H11-103201 A 4/1999

OTHER PUBLICATIONS

International Search Report and Written Opinion mailed on Jul. 25, 2023, received for PCT Application PCT/ JP2023/018325, filed on May 16, 2023, 8 pages including English Translation.

* cited by examiner

*Primary Examiner* — Alexander H Taningco
*Assistant Examiner* — Marin Stoytchev Stoytchev
(74) *Attorney, Agent, or Firm* — XSENSUS LLP

(57) ABSTRACT

A driving method of an intelligent reflecting surface having a plurality of reflecting elements arranged in a matrix, the method includes dividing the plurality of reflecting elements arranged in the matrix into a first region that controls an amount of phase change for each row of the plurality of reflecting elements arrayed in a row direction and a second region that controls an amount of phase change for every two adjacent rows of a plurality of reflecting elements arrayed in the row direction, and driving each of the plurality of reflecting elements belonging to the first region and the second region simultaneously.

6 Claims, 11 Drawing Sheets

FIG.7

| | Voltage setting | | | | | | | | | | | |
|---|---|---|---|---|---|---|---|---|---|---|---|---|
| | C1 | C2 | C3 | C4 | C5 | C6 | C7 | C8 | C9 | C10 | C11 | ... |
| Phase setting | 0 | 60 | 120 | 180 | 240 | 330 | | 60 | 120 | 180 | 240 | ... |
| R1 | V0 | V1 | V2 | V3 | V4 | V5 | V6 | V1 | V2 | V3 | V4 | ... |
| R2 | V0 | V1 | V2 | V3 | V4 | V5 | V6 | V1 | V2 | V3 | V4 | ... |
| R3 | V0 | V1 | V2 | V3 | V4 | V5 | V6 | V1 | V2 | V3 | V4 | ... |
| R4 | V0 | V1 | V2 | V3 | V4 | V5 | V6 | V1 | V2 | V3 | V4 | ... |
| R5 | V0 | V1 | V2 | V3 | V4 | V5 | V6 | V1 | V2 | V3 | V4 | ... |
| R6 | V0 | V1 | V2 | V3 | V4 | V5 | V6 | V1 | V2 | V3 | V4 | ... |
| R7 | V0 | V1 | V2 | V3 | V4 | V5 | V6 | V1 | V2 | V3 | V4 | ... |
| R8 | V0 | V1 | V2 | V3 | V4 | V5 | V6 | V1 | V2 | V3 | V4 | ... |
| R9 | V0 | V1 | V2 | V3 | V4 | V5 | V6 | V1 | V2 | V3 | V4 | ... |
| R10 | V0 | V1 | V2 | V3 | V4 | V5 | V6 | V1 | V2 | V3 | V4 | ... |
| R11 | V0 | V1 | V2 | V3 | V4 | V5 | V6 | V1 | V2 | V3 | V4 | ... |

136 (C1–C5) 138 (C6–C7) 136 (C8–C11)

FIG.8

| | Voltage setting | | | | | | | | | | | |
|---|---|---|---|---|---|---|---|---|---|---|---|---|
| | C1 | C2 | C3 | C4 | C5 | C6 | C7 | C8 | C9 | C10 | C11 | • • • |
| Phase setting | 0 | 60 | 120 | 180 | 240 | 330 | | 60 | 120 | 180 | 240 | • • • |
| R1 | V0 | V1 | V2 | V3 | V4 | V5 | V6 | V1 | V2 | V3 | V4 | • • • |
| R2 | V0 | V1 | V2 | V3 | V4 | V6 | V5 | V1 | V2 | V3 | V4 | • • • |
| R3 | V0 | V1 | V2 | V3 | V4 | V5 | V6 | V1 | V2 | V3 | V4 | • • • |
| R4 | V0 | V1 | V2 | V3 | V4 | V6 | V5 | V1 | V2 | V3 | V4 | • • • |
| R5 | V0 | V1 | V2 | V3 | V4 | V5 | V6 | V1 | V2 | V3 | V4 | • • • |
| R6 | V0 | V1 | V2 | V3 | V4 | V6 | V5 | V1 | V2 | V3 | V4 | • • • |
| R7 | V0 | V1 | V2 | V3 | V4 | V5 | V6 | V1 | V2 | V3 | V4 | • • • |
| R8 | V0 | V1 | V2 | V3 | V4 | V6 | V5 | V1 | V2 | V3 | V4 | • • • |
| R9 | V0 | V1 | V2 | V3 | V4 | V5 | V6 | V1 | V2 | V3 | V4 | • • • |
| R10 | V0 | V1 | V2 | V3 | V4 | V6 | V5 | V1 | V2 | V3 | V4 | • • • |
| R11 | V0 | V1 | V2 | V3 | V4 | V5 | V6 | V1 | V2 | V3 | V4 | • • • |
| | 136 | | | | | 138 | | 136 | | | | |

FIG.9

| | Voltage setting | | | | | | | | | | | |
|---|---|---|---|---|---|---|---|---|---|---|---|---|
| | C1 | C2 | C3 | C4 | C5 | C6 | C7 | C8 | C9 | C10 | C11 | ... |
| R1 | V0 | V1 | V2 | V3 | V4 | V5 | V6 | V1 | V2 | V3 | V4 | ... |
| R2 | V6 | V0 | V1 | V2 | V3 | V4 | V5 | V6 | V1 | V2 | V3 | ... |
| R3 | V5 | V6 | V0 | V1 | V2 | V3 | V4 | V5 | V6 | V1 | V2 | ... |
| R4 | V4 | V5 | V6 | V0 | V1 | V2 | V3 | V4 | V5 | V6 | V1 | ... |
| R5 | V3 | V4 | V5 | V6 | V0 | V1 | V2 | V3 | V4 | V5 | V6 | ... |
| R6 | V2 | V3 | V4 | V5 | V6 | V0 | V1 | V2 | V3 | V4 | V5 | ... |
| R7 | V1 | V2 | V3 | V4 | V5 | V6 | V0 | V1 | V2 | V3 | V4 | ... |
| R8 | V0 | V1 | V2 | V3 | V4 | V5 | V6 | V0 | V1 | V2 | V3 | ... |
| R9 | V6 | V0 | V1 | V2 | V3 | V4 | V5 | V6 | V0 | V1 | V2 | ... |
| R10 | V5 | V6 | V0 | V1 | V2 | V3 | V4 | V5 | V6 | V0 | V1 | ... |
| R11 | V4 | V5 | V6 | V0 | V1 | V2 | V3 | V4 | V5 | V6 | V0 | ... |

136

138

DRIVING METHOD OF INTELLIGENT REFLECTING SURFACE

CROSS-REFERENCE TO RELATED APPLICATIONS

This application is a Continuation of International Patent Application No. PCT/JP2023/018325, filed on May 16, 2023, which claims the benefit of priority to Japanese Patent Application No. 2022-110314, filed on Jul. 8, 2022, the entire contents of each are incorporated herein by reference.

FIELD

An embodiment of the present invention relates to a driving method of an intelligent reflecting surface capable of controlling the direction of travel of reflected radio waves.

BACKGROUND

A phased array antenna device controls directivity while the antenna is fixed by adjusting the amplitude and phase of a high-frequency signal to be applied to each of a plurality of antenna elements arranged in a plane shape. The phased array antenna device requires a phase shifter. A phased array antenna device using a phase shifter utilizing a change in a dielectric constant depending on the alignment state of a liquid crystal is disclosed (For example, refer to Japanese laid-open patent publication No. H11-103201).

A radio wave reflecting device such as a phased array antenna device, which uses a radio wave reflector that can control the direction of reflection using liquid crystals, is desired to have a wide variable range of reflection phases to control the direction of reflection in all directions.

SUMMARY

A driving method of an intelligent reflecting surface having a plurality of reflecting elements arranged in a matrix in an embodiment according to the present invention includes dividing the plurality of reflecting elements arranged in the matrix into a first region that controls an amount of phase change for each column of the plurality of reflecting elements arranged in a column direction and a second region that controls an amount of phase change for every two adjacent columns of a plurality of reflecting elements arranged in the column direction, and driving each of the plurality of reflecting elements belonging to the first region and the second region simultaneously.

BRIEF DESCRIPTION OF DRAWINGS

FIG. 7 is a diagram showing the voltage applied to a plurality of reflecting elements in a method of driving an intelligent reflecting surface according to an embodiment of the present invention.

FIG. 8 is a diagram showing the voltage applied to a plurality of reflecting elements in a method of driving an intelligent reflecting surface according to an embodiment of the present invention.

FIG. 9 is a diagram showing the voltage applied to a plurality of reflecting elements in a method of driving an intelligent reflecting surface according to an embodiment of the present invention.

DESCRIPTION OF EMBODIMENTS

Hereinafter, embodiments of the present invention are described with reference to the drawings. However, the present invention can be implemented in many different aspects, and should not be construed as being limited to the description of the following embodiments. For the sake of clarifying the explanation, although the drawings may be expressed schematically with respect to the width, thickness, shape, and the like of each part compared to the actual aspect, the drawings are only an example and do not limit the interpretation of the present invention. In this specification and each drawing, elements similar to those described previously with respect to previous drawings may be given the same reference sign (or a number followed by a, b, etc.) and a detailed description may be omitted as appropriate. The terms "first" and "second" appended to each element are a convenience sign used to distinguish them and have no further meaning except as otherwise explained.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

As used herein, an intelligent reflecting surface is also referred to as a radio wave reflecting device.

1. Reflecting Element

Figure 1A:
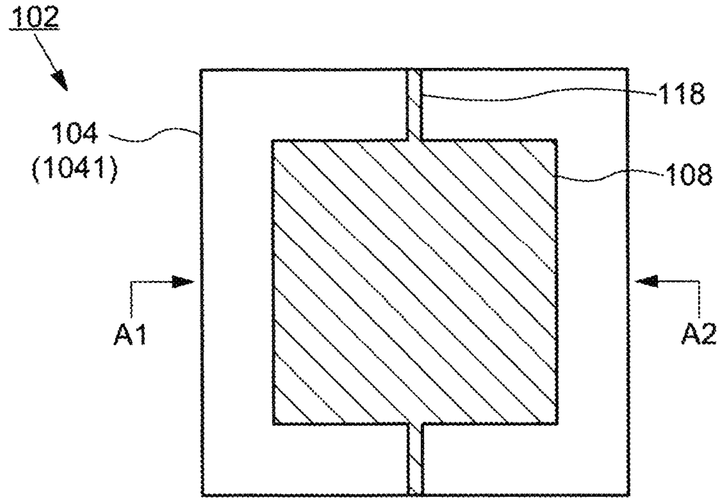
FIG. 1A is a plan view of a reflecting element utilized in an intelligent reflecting surface according to an embodiment of the present invention.
Figure 1B:
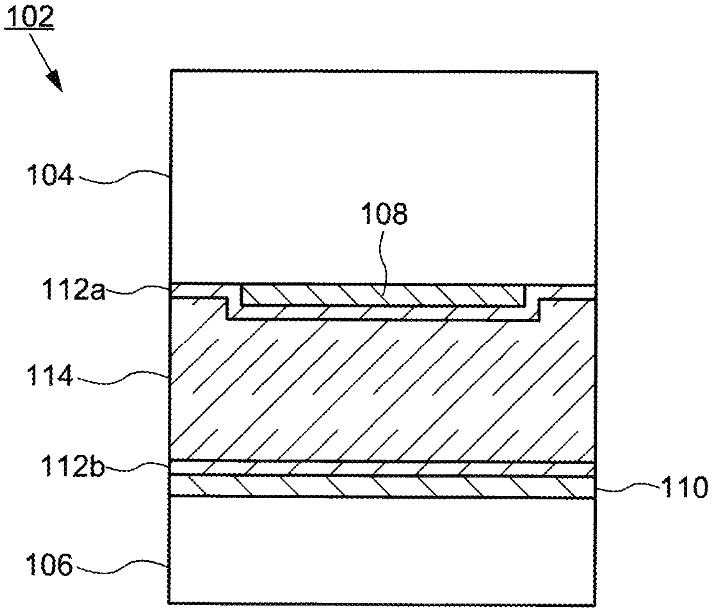
FIG. 1B a diagram showing a cross-sectional structure between A1-A2 shown in the plan view of a reflecting element utilized in an intelligent reflecting surface according to the embodiment of the present invention shown in FIG. 1A.

FIG. 1A and FIG. 1B show a reflecting element 102 used in an intelligent reflecting surface 100 according to an embodiment of the present invention. FIG. 1A shows a plan view of the reflecting element 102 viewed from above (a side where radio waves enter), and FIG. 1B shows a cross-sectional view between A1-A2 shown in the plan view.

As shown in FIG. 1A and FIG. 1B, the reflecting element 102 includes a dielectric substrate 104, a counter substrate 106, a patch electrode 108, a common electrode 110, a liquid crystal layer 114, a first alignment film 112*a*, and a second alignment film 112*b*. In the reflecting element 102, the dielectric substrate 104 can be regarded as a dielectric layer as it forms a single layer. The patch electrode 108 is arranged on the dielectric substrate (dielectric layer) 104, and the common electrode 110 is arranged on the counter substrate 106. The first alignment film 112*a* is arranged on the dielectric substrate (dielectric layer) 104 to cover the patch electrode 108, and the second alignment film 112*b* is arranged on the counter substrate 106 to cover the common electrode 110. The patch electrode 108 and the common electrode 110 are arranged to face each other, and the liquid crystal layer 114 is sandwiched between the patch electrode 108 and the common electrode 110. The first alignment film 112*a* is interposed between the patch electrode 108 and the liquid crystal layer 114, and the second alignment film 112*b* is interposed between the common electrode 110 and the liquid crystal layer 114.

The patch electrode 108 is preferably symmetrical with respect to the vertical and horizontal polarization of the irradiated radio wave, and has a square or circular shape in a plan view. FIG. 1A shows the case where the patch electrode 108 has a square shape when seen in a plan view. There is no particular limitation to the shape of the common electrode 110 and it may have a shape in which almost the entire surface of the counter substrate 106 widens to have an area wider than the patch electrode 108. There is no limitation on materials used to form the patch electrode 108 and the common electrode 110, which may be formed using conductive metals and metal oxides. The dielectric substrate (dielectric layer) 104 may also be disposed with a first wiring 118. The first wiring 118 is directly or electrically connected to the patch electrode 108. The first wiring 118 can be used to apply a control signal to the patch electrode 108. For example, the first wiring 118 can also be used to connect one patch electrode 108 to an adjacent patch electrode 108 when a plurality of reflecting elements is arranged.

Although not shown in FIG. 1A and FIG. 1B, the dielectric substrate (dielectric layer) 104 and the counter substrate 106 are bonded together by a sealant. The dielectric substrate (dielectric layer) 104 and the counter substrate 106 are arranged opposite each other with a gap between them, and the liquid crystal layer 114 is provided within the area enclosed by the sealant. The liquid crystal layer 114 is provided to fill the gap between the dielectric substrate (dielectric layer) 104 and the counter substrate 106. A distance between the dielectric substrate (dielectric layer) 104 and the counter substrate 106 is 20 to 100 μm, for example, a distance of 50 μm in this case. Since the patch electrode 108, the common electrode 110, the first alignment film 112*a*, and the second alignment film 112*b* are disposed between the dielectric substrate (dielectric layer) 104 and the counter substrate 106, the distance between the first alignment film 112*a* and the second alignment film 112*b* disposed on each of the dielectric substrate (dielectric layer) 104 and the counter substrate 106 is precisely the thickness of the liquid crystal layer 114. Although not shown in FIG. 1B, a spacer may be disposed between the dielectric substrate (dielectric layer) 104 and the counter substrate 106 to keep the distance constant.

A control signal is applied to the patch electrode 108 to control the alignment of liquid crystal molecules in the liquid crystal layer 114. The control signal is a DC voltage signal or a polarity inversion signal in which positive and negative DC voltages are alternately inverted. The common electrode 110 is applied with a voltage at ground or at an intermediate level of the polarity reversal signal. When the control signal is applied to the patch electrode 108, the alignment state of the liquid crystal molecules contained in the liquid crystal layer 114 is changed. Liquid crystal materials having dielectric constant anisotropy are used for the liquid crystal layer 114. For example, nematic, smectic, cholesteric, and discotic liquid crystals are used as the liquid crystal layer 114. The liquid crystal layer 114 with dielectric constant anisotropy has a dielectric constant that changes due to changes in the alignment state of the liquid crystal molecules. The reflecting element 102 can change the dielectric constant of the liquid crystal layer 114 by the control signal applied to the patch electrode 108, thereby delaying the phase of the reflected wave when radio waves are reflected.

The frequency bands of radio waves reflected by the reflecting element 102 are the Very-High Frequency (VHF) band, Ultra-High Frequency (UHF) band, Super-High Frequency (SHF) band, Tremendously High Frequency (THF), and Extra High Frequency (EHF) band. Although the liquid crystal molecules in the liquid crystal layer 114 align themselves in response to the control signal applied to the patch electrode 108, they hardly follow the frequency of the radio waves irradiated to the patch electrode 108. Therefore, the reflecting element 102 can control the phase of the reflected radio waves without being affected by radio waves.

Figure 2A:
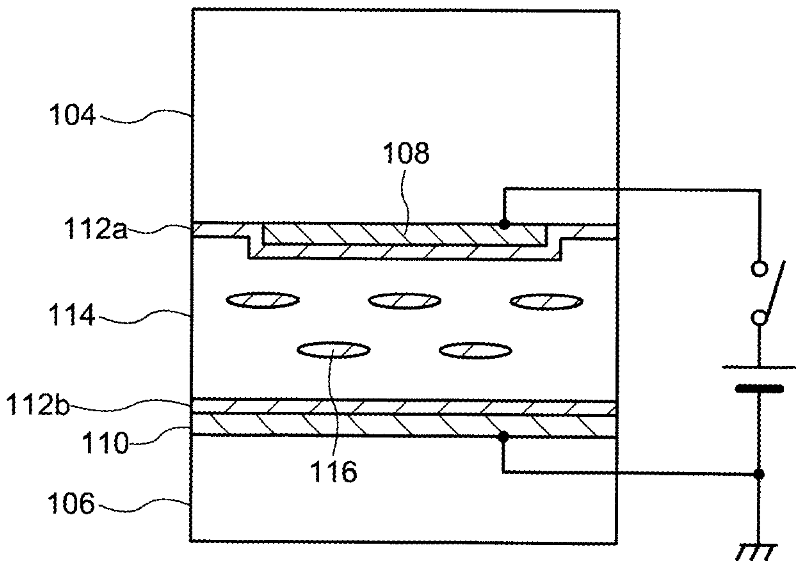
FIG. 2A is a diagram showing a state in which no voltage is applied between a patch electrode and a common electrode when a reflecting element utilized in an intelligent reflecting surface according to an embodiment of the present invention operates.
Figure 2B:
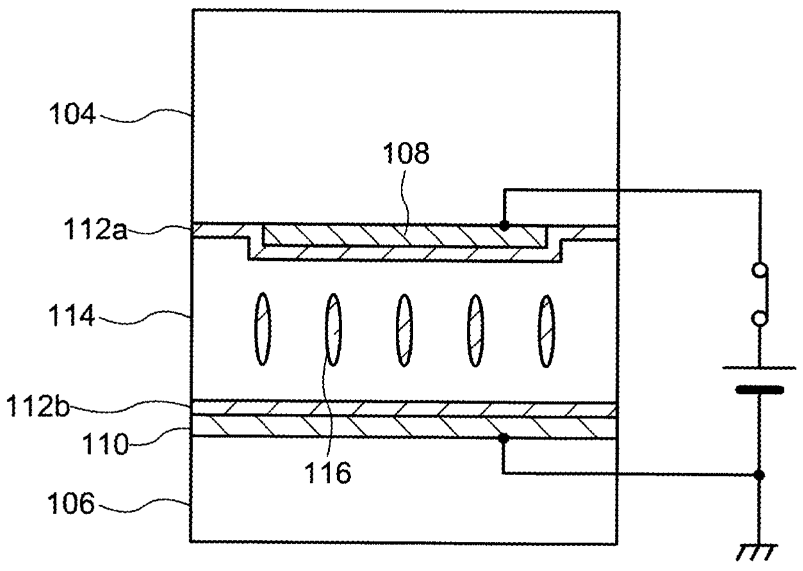
FIG. 2B is a diagram showing a state in which a voltage is applied between a patch electrode and a common electrode when a reflecting element used in an intelligent reflecting surface according to an embodiment of the present invention operates.

FIG. 2A shows a state ("a first state") in which a voltage is not applied between the patch electrode 108 and the common electrode 110. FIG. 2A shows an example where the first alignment film 112*a* and the second alignment film 112*b* are horizontally aligned films. The long axis of the liquid crystal molecules 116 in the first state is aligned horizontally with respect to the surfaces of the patch electrode 108 and the common electrode 110 by the first alignment film 112*a* and the second alignment film 112*b*. FIG. 2B shows a state ("a second state") in which a control signal (a voltage signal) is applied to the patch electrode 108. The liquid crystal molecules 116 are aligned in the second state with the long axis perpendicular to the surfaces of the patch electrode 108 and the common electrode 110 under the effect of the electric field. According to the magnitude of the control signal applied to the patch electrode 108 (magnitude of the voltage between the counter electrode and the patch electrode), it is possible to align the angle at which the long axis of the liquid crystal molecules 116 is aligned in an intermediate direction between the horizontal and vertical directions.

When the liquid crystal molecules 116 have positive dielectric constant anisotropy, the dielectric constant is larger in the second state relative to the first state. When the liquid crystal molecules 116 have negative dielectric constant anisotropy, the dielectric constant is smaller in the second state relative to the first state. The liquid crystal layer 114 having dielectric anisotropy can be regarded as a variable dielectric layer. The reflecting element 102 can be controlled to delay (or not) the phase of the reflected wave by using the dielectric constant anisotropy of the liquid crystal layer 114.

The reflecting element 102 is used for a radio wave reflector that reflects radio waves in a specified direction. The reflecting element 102 preferably does not attenuate the amplitude of reflected radio waves as much as possible. As is clear from the structure shown in FIG. 1B, when radio waves propagating in the air are reflected by the reflecting element 102, the radio waves pass through the dielectric substrate (dielectric layer) 104 twice. The dielectric substrate (dielectric layer) 104 is formed of a dielectric material such as glass or resin, for example.

2. Intelligent reflecting surface

Next, a configuration of the intelligent reflecting surface in which the reflecting elements are integrated is shown.

2-1. Intelligent reflecting surface A (Uniaxial Reflection Control)

Figure 3:
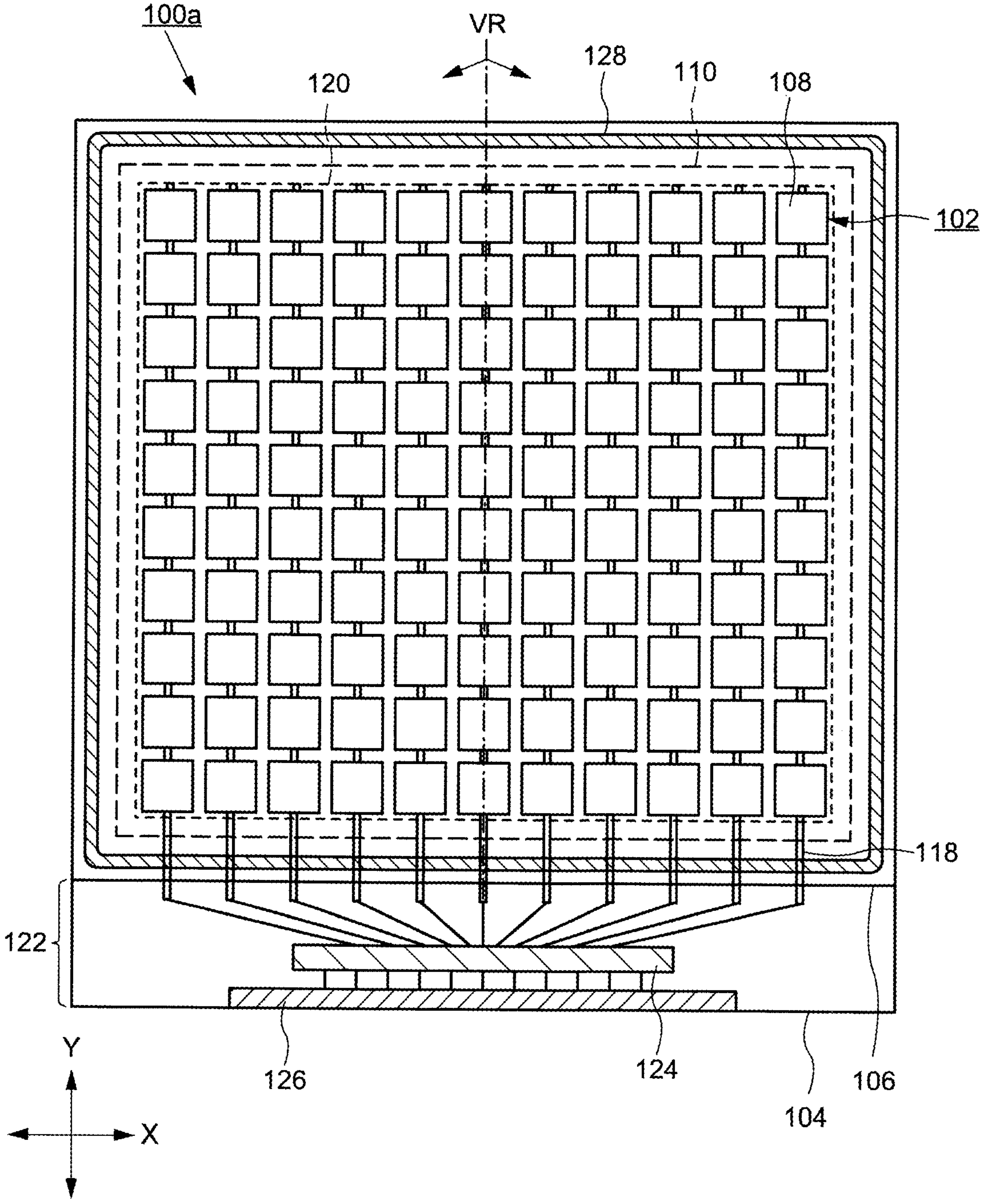
FIG. 3 is a diagram showing the structure of an intelligent reflecting surface according to an embodiment of the present invention.

FIG. 3 shows a configuration of an intelligent reflecting surface 100*a* according to an embodiment of the present invention. The intelligent reflecting surface 100*a* includes a radio wave reflector 120. The radio wave reflector 120 is configured with a plurality of reflecting elements 102. The plurality of reflecting elements 102 are arranged, for example, in a column direction (X-axis direction shown in FIG. 3) and in a row direction (Y-axis direction shown in FIG. 3) that intersects the column direction. The plurality of reflecting elements 102 are arranged so that the patch electrodes 108 face the plane of incidence of radio waves. The radio wave reflector 120 is flat, and the plurality of patch electrodes 108 are arranged in this flat plane in a matrix.

The intelligent reflecting surface 100*a* has a structure in which the plurality of reflecting elements 102 are integrated on a single dielectric substrate (dielectric layer) 104. As shown in FIG. 3, the intelligent reflecting surface 100 has a structure in which a dielectric substrate (dielectric layer) 104 with an array of the plurality of patch electrodes 108 and the counter substrate 106 with the common electrode 110 are arranged on top of each other, and the liquid crystal layer (not shown) is disposed between the two substrates. The radio wave reflector 120 is formed in the region where the plurality of patch electrodes 108 and the common electrode 110 are superimposed. A cross-sectional structure of the radio wave reflector 120 is the same as that of the reflecting element 102 shown in FIG. 1B when viewed with respect to the individual patch electrodes 108. The dielectric substrate (dielectric layer) 104 and the counter substrate 106 are bonded to each other by the sealant 128, and the liquid crystal layer, not shown, is disposed in the region inside the sealant 128.

The dielectric substrate (dielectric layer) 104 has a peripheral area 122 that extends outward from the counter substrate 106 in addition to the area that faces the counter substrate 106. The peripheral region 122 is disposed with a first driver circuit 124 and a terminal part 126. The first driver circuit 124 outputs control signals to the patch electrode 108. The terminal part 126 is a region that forms a connection with an external circuit, for example, a connected flexible printed circuit board, not shown in the diagram. Signals controlling the first driver circuit 124 are input to the terminal part 126.

As described above, the plurality of patch electrodes 108 is arranged on the dielectric substrate (dielectric layer) 104 in the column (X-axis) and the row (Y-axis) directions. A plurality of first wirings 118 extending in the row direction (Y-axis direction) are arranged on the dielectric substrate (dielectric layer) 104. Each of the plurality of first wirings 118 is electrically connected to the plurality of patch electrodes 108 arranged in the row direction (Y-axis direction). In other words, the plurality of patch electrodes 108 arranged in the row direction (Y-axis direction) are connected by the first wiring 118. The radio wave reflector 120 has a configuration of a plurality of patch electrode arrays in a single row connected by the first wiring 118 in the column direction (X-axis direction).

The plurality of first wirings 118 arranged on the radio wave reflector 120 extend to the peripheral region 122 and are connected to the first driver circuit 124. The first driver circuit 124 outputs control signals to be applied to the patch electrode 108. The first driver circuit 124 can output control signals of different voltage levels to each of the plurality of first wirings 118. As a result, the control signal is applied to the plurality of patch electrodes 108 arranged in the column (X-axis) and row (Y-axis) directions in the radio wave reflector 120, row by row (for each patch electrode 108 arranged in the row direction (Y-axis)).

A control signal is applied to each pair of the plurality of patch electrodes 108 arranged in the row direction (Y-axis direction) in the intelligent reflecting surface 100*a*. Thereby, the direction of reflection of the reflected wave of a radio wave incident on the radio wave reflector 120 can be controlled. That is, the intelligent reflecting surface 100*a* can control the direction of travel of the reflected wave in the left and right directions on the drawing with respect to the reflection axis VR, which is parallel to the row direction (Y-axis direction), of the radio wave irradiated on the radio wave reflector 120.

Figure 4:
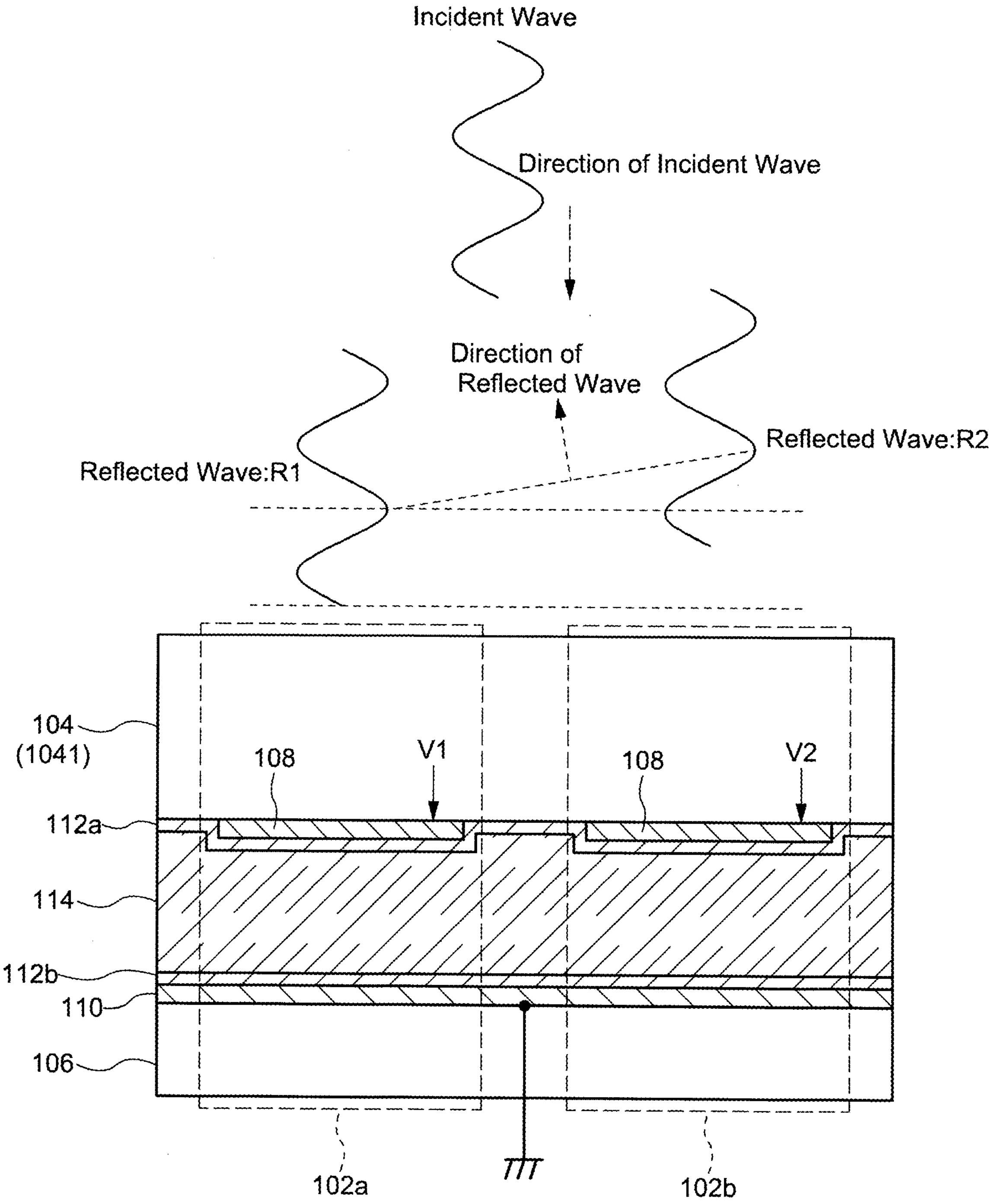
FIG. 4 is a schematic diagram showing a change in the traveling direction of a reflected wave by an intelligent reflecting surface according to an embodiment of the present invention.

FIG. 4 schematically shows that the direction of travel of the reflected wave is changed by the two reflecting elements 102. In the case where radio waves are incident on the first reflecting element 102*a* and the second reflecting element 102*b* at the same phase, since different control signals (V1≠V2) are applied to the first reflecting element 102*a* and the second reflecting element 102*b*, the phase change of the reflected wave by the second reflecting element 102*b* is larger than that of the first reflecting element 102*a*. As a result, the phase of the reflected wave R1 reflected by the first reflecting element 102*a* and the phase of the reflected wave R2 reflected by the second reflecting element 102*b* differ (in FIG. 4, the phase of the reflected wave R2 is more advanced than that of the reflected wave R1), and the apparent traveling direction of the reflected wave changes obliquely.

When such a principle is applied to the intelligent reflecting surface 100*a* shown in FIG. 3, for example, the direction of reflection can be controlled in a uniaxial direction by controlling the amount of phase change by the reflecting elements on a column-by-column basis.

2-2. Intelligent reflecting surface B (Biaxial Reflection Control)

Since the intelligent reflecting surface 100*a* in FIG. 3 has a single reflection axis VR, the reflection angle can be controlled in the direction with the reflection axis VR as the axis of rotation. In contrast, this embodiment shows an example of an intelligent reflecting surface 100*b* that is capable of biaxial reflection control. In the following description, the focus will be on the parts that differ from the intelligent reflecting surface 100*a*.

The intelligent reflecting surface 100*b* has a plurality of second wirings 132 extending in the column direction (X-axis direction). The plurality of first wirings 118 and the plurality of second wirings 132 are arranged to intersect across an insulating layer not shown in the diagram. The plurality of first wirings 118 are connected to a first driver circuit 124, and the plurality of second wirings 132 are connected to a second driver circuit 130. The second driver circuit 130 outputs scanning signals.

Figure 5:
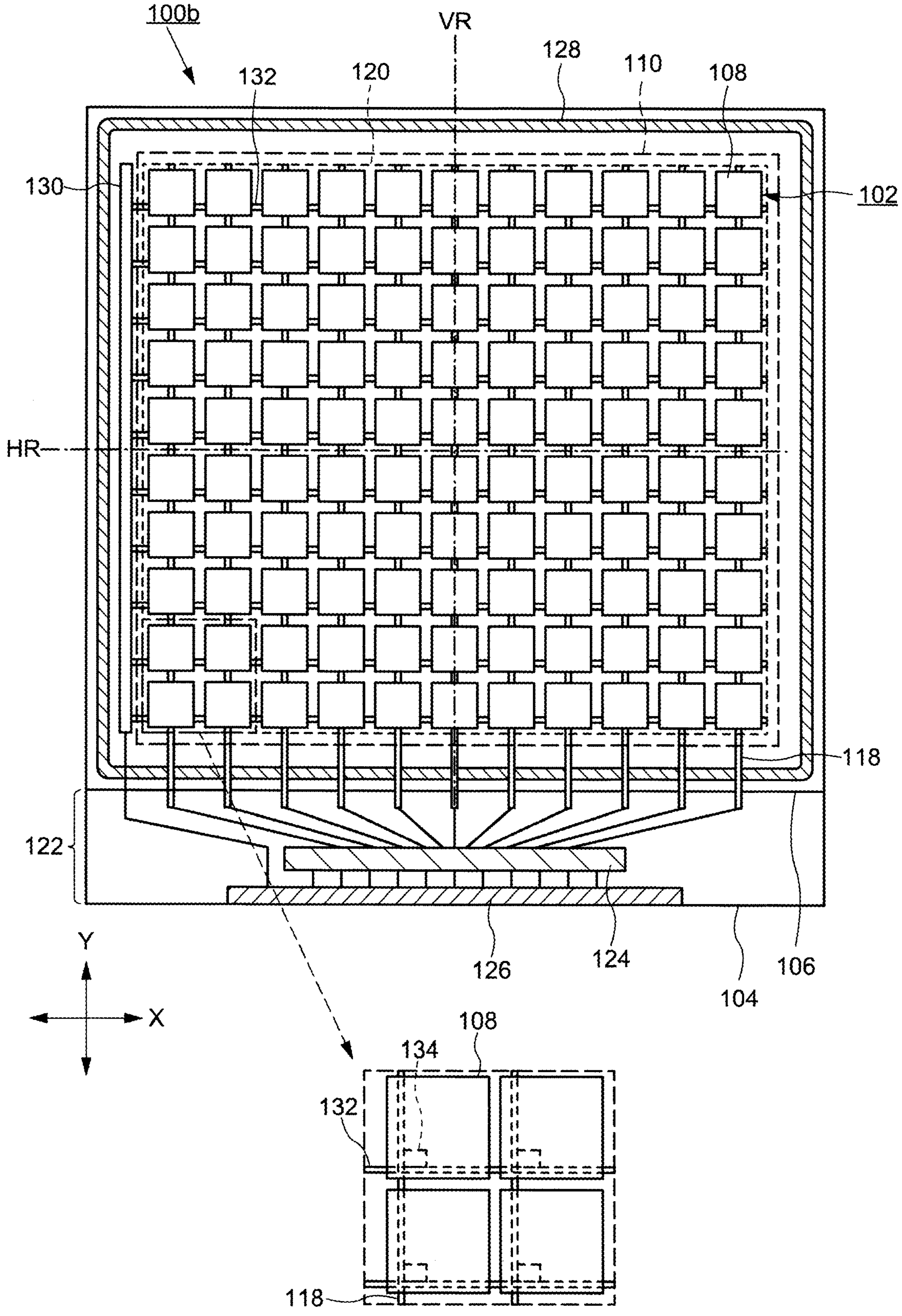
FIG. 5 is a diagram showing the structure of an intelligent reflecting surface according to an embodiment of the present invention.

FIG. 5 shows an enlarged inset of the arrangement of the four patch electrodes 108, the first wirings 118 and the second wirings 132. Each of the four patch electrodes 108 is disposed with a switching element 134. Switching (on and off) of the switching element 134 is controlled by the scanning signal applied to the second wiring 132. A control signal is applied from the first wiring 118 to the patch electrode 108 where the switching element 134 is turned on. The switching element 134 is formed, for example, by a thin-film transistor. According to this configuration, the plurality of patch electrodes 108 arranged in the column direction (X-axis direction) can be selected row by row, and control signals of different voltage levels can be applied to each row.

The intelligent reflecting surface 100*b* shown in FIG. 5 can control the direction of travel of the reflected wave in the left and right directions on the drawing, centered on the reflection axis VR parallel to the row direction (Y-axis direction), when the radio wave is irradiated on the radio wave reflector 120, furthermore, the direction of travel of the reflected wave can also be controlled in the vertical direction on the drawing, centered on the reflection axis HR parallel to the column direction (X-axis direction). That is, since the intelligent reflecting surface 100*b* has the reflection axis VR parallel to the row direction (Y-axis direction) and the reflection axis VH parallel to the column direction (X-axis direction), the reflection angle can be controlled in the direction with the reflection axis VR as the axis of rotation and in the direction with the reflection axis HR as the axis of rotation.

When this principle is applied, for example, to the intelligent reflecting surface 100*b* shown in FIG. 5, the reflection direction can be controlled in uniaxial and biaxial directions by independently controlling the amount of phase change by the reflecting elements in both columns and rows.

3. Driving Method

Next, the driving method of the intelligent reflecting surface 100 is described.

Figure 6:
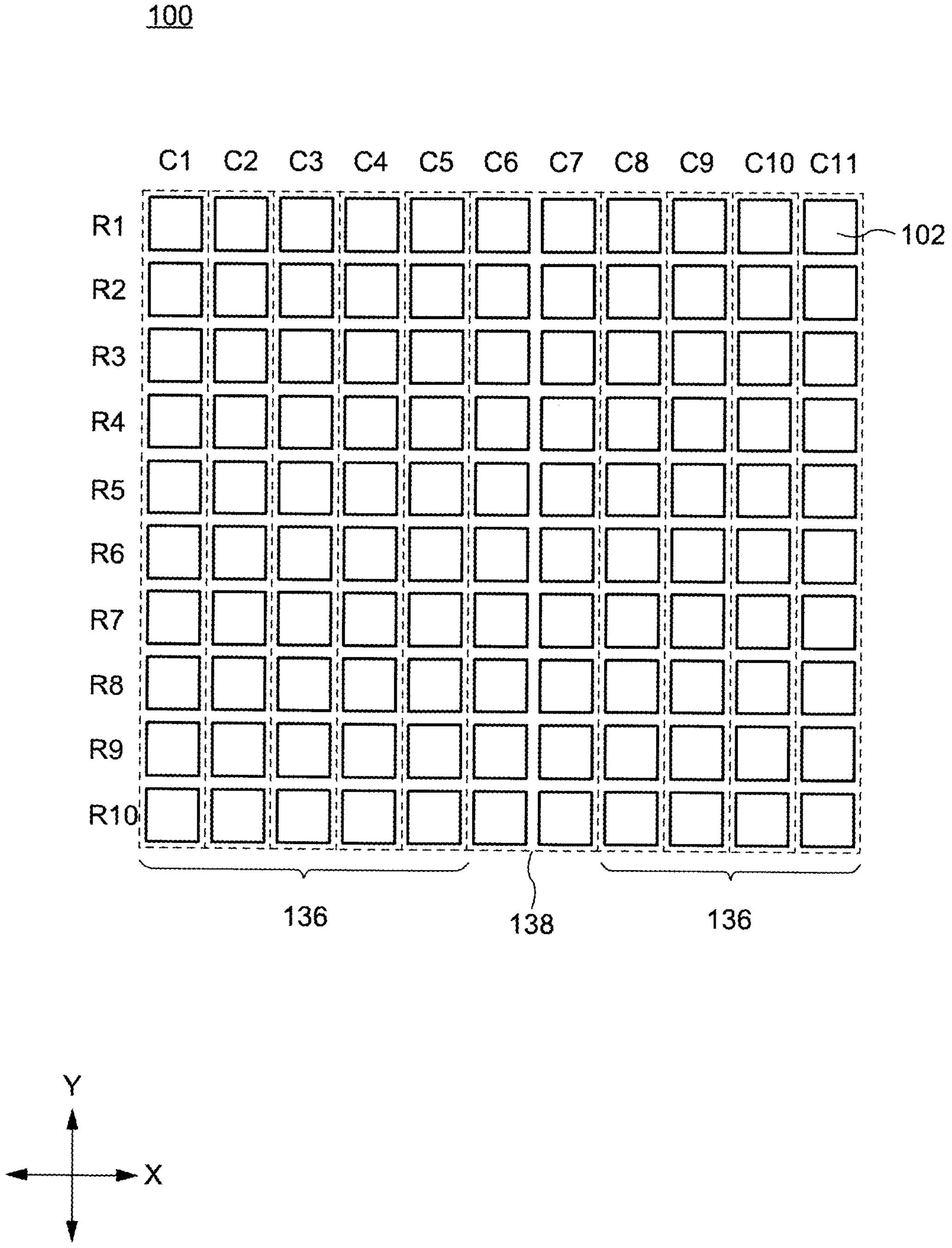
FIG. 6 is a diagram showing an example of the address of each reflecting element of the intelligent reflecting surface shown in FIGS. 3 and 5.

FIG. 6 shows the arrangement of the reflecting elements 102 in the intelligent reflecting surface 100 shown in FIGS. 3 and 5. As shown in FIG. 6, the reflecting elements 102 are arranged in the column direction (X-axis direction) from row 1 (R1) to row 10 (R10) and in the row direction (Y-axis direction) from column 1 (C1) to column 11 (C11).

3-1. Control of Reflection Direction-1

Referring to FIG. 6, the driving method of the intelligent reflecting surface 100*a*, which controls the reflection direction in the column direction (X-axis direction), is described.

The arrangement of the plurality of reflecting elements 102 in the intelligent reflecting surface 100*a* is divided into a first region 136 and a second region 138, as shown in FIG. 6. The first region 136 and the second region 138 are arranged next to each other and are repeated in at least one direction, in the column direction (X-axis direction) or the row direction (Y-axis direction).

The plurality of reflecting elements 102 divided into the first region 136 are arranged in the row direction, and the amount of phase change is controlled for each row. The plurality of reflecting elements 102 that are divided into the second region 138 are arranged in the row direction, and the amount of phase change is controlled for every two adjacent rows. Furthermore, the respective plurality of reflecting elements 102 belonging to the first region 136 and the second region 138 are driven simultaneously. The amount of phase change controlled by these reflecting elements 102 belonging to the second region 138 is greater than the amount of phase change controlled by the reflecting elements 102 belonging to the first region 136.

Referring to FIG. 7, the driving method of the intelligent reflecting surface 100 shown in FIG. 6 is specifically explained. The voltage settings shown in FIG. 7 are examples for controlling reflections in a one-dimensional direction. FIG. 7 shows the amounts of phase change (phase setting) of the reflected wave set for the plurality of reflecting elements 102 shown in FIG. 6 and the voltage (voltage setting) applied to the reflecting elements 102 corresponding to the respective amounts of phase change.

The intelligent reflecting surface used for the driving method shown in FIG. 7 is preferably the intelligent reflecting surface shown in FIG. 5, which controls the amount of phase change by the reflecting elements independently for both columns and rows.

As shown in FIG. 7, the same voltage is applied to a plurality of reflecting elements 102 arranged in the same column, and different voltages are applied to a plurality of reflecting elements 102 arranged in the same row.

The reflecting elements 102 arranged in columns C1 to C5 of the first region 136 shown in FIG. 6 are set to an amount of phase change of 0°, 60°, 120°, 180°, and 240° per row, respectively, as shown in FIG. 7. With respect to the reflecting elements 102 arranged in C1, where the phase change of 0° is set, voltage V0 is applied. With respect to the reflecting elements 102 arranged in columns C2 to C5, voltages V1, V2, V3, and V4 are also applied per row, respectively. In this case, the absolute values of the voltages applied to the reflecting elements 102 arranged in columns C1 to C5 among the reflecting elements 102 belonging to the first region 136 are greater in the order of voltage V0 to voltage V4, similar to the relationship of the amount of phase change. The change from voltage V0 to voltage V4 is not a linear increase in voltage, but is set appropriately in consideration of the change in dielectric constant of the liquid crystal with respect to the applied voltage.

Furthermore, with respect to the reflecting elements 102 arranged in columns C8 to C11 in the first region 136, similar to the reflecting elements 102 arranged in columns C1 to C5, an amount of phase change is set for each column, and voltages V1 to V4 corresponding to the amount of phase change are applied to each column, respectively.

The reflecting elements 102 belonging to the second region 138 are arranged in columns C6 and C7, respectively, and an amount of phase change of 330°, which is considered a high phase difference, is set in the two columns of C6 and C7, for example. Here, the phase difference set in the second region 138 is preferably between 270° and 360°. With respect to the reflecting elements 102 arranged in column C6, voltage V5 is applied, and with respect to the reflecting elements 102 arranged in column C7, voltage V6 is applied. The absolute value of voltage V5 is less than the absolute value of voltage V6 and less than the absolute value of voltage V4 applied to the reflecting elements 102 arranged in column C5 of the first region 136. Put another way, the reflecting elements 102 arranged in column C6 are smaller than the absolute value of the voltage applied to the reflecting elements 102 arranged in the adjacent columns C5 and C6.

Although FIG. 6 and FIG. 7 show examples of columns C1 to C5 in which the plurality of the reflecting elements 102 belonging to the first region 136 are arranged and columns C6 and C7 in which the plurality of the reflecting elements 102 belonging to the second region 138 are arranged, there is no limit to the number of columns of the plurality of the reflecting elements 102 belonging to the first region 136. For example, there are columns from C1 to Cn (n is a natural number greater than or equal to 3) in which the plurality of the reflecting elements 102 belonging to the first region 136 are arranged, and the amount of phase change is set for the plurality of the reflecting elements 102 arranged in columns C1 to Cn for each one column. Furthermore, voltages V0 to Vn are applied to the reflecting elements 102 arranged in columns C1 to Cn, respectively, one column at a time.

Next, a plurality of the reflecting elements 102 belonging to the second region 138 are arranged in adjacent columns Cn+1 and Cn+2. An amount of phase change greater than the amount of phase change set for the reflecting elements 102 in the first region 136 is set for the plurality of reflecting elements 102 arranged in these two adjacent columns. Furthermore, a combination of the voltages Va and Vb is applied to the reflecting elements 102 arranged in columns Cn+1 and Cn+2, respectively. Here, the absolute value of the voltage Va is smaller than the absolute values of the voltage Vb and the voltage Vn, or put another way, the absolute values of the voltage Vb and the voltage Vn are greater than the absolute value of the voltage Va. The combination of the voltage Va and the voltage Vb can be set to a voltage at which the composite wave of the reflected wave by the reflecting element to which the voltage Va is applied and the reflected wave by the reflecting element to which the voltage Vb is applied is greater than the phase change set for the first region 136.

The reflecting elements 102 belonging to the first region 136 to which the voltage Vn is applied can be arranged in the row direction aligned with the reflecting elements 102 belonging to the second region 138 to which the voltage Va is applied and the reflecting elements 102 belonging to the second region 138 to which the voltage Vb is applied.

Furthermore, the voltage applied to the reflecting element 102 is applied to the patch electrode 108 comprising the reflecting element 102, as described above. Therefore, the patch electrode 108 of the reflecting element 102 belonging to the first region 136 to which the voltage Vn is applied can be arranged with the patch electrode 108 of the reflecting element 102 belonging to the second region 138 to which the voltage Va is applied and the patch electrode 108 of the reflecting element 102 belonging to the second region 138 to which the voltage Vb is applied in the row direction.

Thus, in an intelligent reflecting surface, in contrast to the first region where the amount of phase change is set for each column and the corresponding voltage is applied, in the second region where the set value of the amount of phase change is larger than the first region, two adjacent rows are set as a pair and the specified voltage is applied within that column. This allows for a wider range of reflection phase variation within the reflective surface of the intelligent reflecting surface.

3-2. Control of Reflection Direction-2

Referring to FIG. 8, the driving method of the intelligent reflecting surface 100 that controls the reflection direction in the row direction (X-axis direction) is described. The difference from the driving method shown in FIG. 7 is that different voltages are applied to the plurality of reflecting elements 102 in the same column among the plurality of the reflecting elements 102 belonging to the second region 138. The same or similar configuration to the driving method shown in FIG. 7 may be omitted from the description.

The plurality of reflecting elements 102 belonging to the second region 138 are arranged along the column direction. Specifically, as shown in FIG. 8, they are arranged along columns C6 and C7. As described above, the voltage Va and the voltage Vb are applied to the plurality of reflecting elements 102 belonging to the second region 138, respectively, and the plurality of reflecting elements 102 belonging to the second region 138 are arranged along the row direction.

Specifically, as shown in FIG. 8, the voltage V5 or the voltage V6 is applied to the plurality of reflecting elements arranged along columns C6 and C7

Similarly, the plurality of patch electrodes 108 of the plurality of reflecting elements 102 belonging to the second region 138 are arranged along the column direction, specifically along columns C6 and C7, as shown in FIG. 8. The voltage Va and the voltage Vb are applied to those plurality of patch electrodes 108, respectively, and those plurality of patch electrodes 108 are arranged along the row direction. Specifically, the voltage V5 or the voltage V6 is applied to the plurality of patch electrodes arranged along columns C6 and C7, as shown in FIG. 8.

In the second region 138, the reflecting elements 102 adjacent in the column direction to the reflecting elements 102 to which the voltage Va is applied are applied with the voltage Vb. In the second region 138, the reflecting elements 102 adjacent in the column direction to the reflecting elements 102 to which the voltage Vb is applied are applied with the voltage Va. In the second region 138, the plurality of reflecting elements 102 to which the voltage Va is applied are arranged diagonally opposite each other. Further, in the second region 138, the plurality of reflecting elements 102 to which the voltage Vb is applied are arranged diagonally opposite each other.

Specifically, as shown in FIG. 8, the second region 138 is arranged in columns C6 and C7, and the voltage V5 is applied to the reflecting element arranged in row R1 of column C6. The voltage V6 is applied to the reflecting element in row R2 of column C6, which is the reflecting element adjacent in the column direction to the reflecting element in row R1 of column C6. The voltage V6 is applied to the reflecting element arranged in row R1 of column C7. The voltage V5 is applied to the reflecting element arranged in row R2 of column C7, which is the reflecting element adjacent to the reflecting element arranged in row R1 of column C7 in the column direction.

The reflecting element arranged in row R1 of column C6 to which the above-mentioned voltage V5 is applied and the reflecting element arranged in row R2 of column C7 to which voltage V5 is applied are arranged diagonally to each other. The reflecting element arranged in row R2 of column C6 to which the above-mentioned voltage V6 is applied and the reflecting element arranged in row R1 of column C7 to which the voltage V6 is applied are arranged diagonally to each other.

In FIG. 8, although the reflecting elements located diagonally opposite each other are shown as a combination of four reflecting elements, there is no limit to the number of reflecting elements which can be combined. For example, the reflecting elements to which the voltage V5 is applied are set to the four reflecting elements in row R1 and row R2 of column C6 and column C7 and the four reflecting elements in row R3 and row R4 of column C8 and column C9, which are located at their diagonals. Then, the reflecting elements to which the voltage V6 is applied can be set to the four reflecting elements in row R1 and row R2 of column C8 and column C9 and the four reflecting elements in row R3 and row R4 of column C6 and column C7 located at the diagonals of those elements.

Furthermore, not only the number of reflecting elements described above, but also the four reflecting elements arranged diagonally opposite each other described above can be additionally arranged in the row and column directions. For example, the voltage settings for the reflecting elements in column C6 and column C7 shown in FIG. 8 can be further set for column C8 and column C9. Specifically, the voltage V5 can be applied to rows R1, R3, . . . and odd numbered rows of column C8 and even numbered rows of row R2 and row R4 of column C9, and the voltage V6 can be applied to rows R1, R3, . . . and odd numbered rows of column C9 and even numbered rows R2 and R4 of column C8.

For the patch electrode 108 that comprises the reflecting element 102 described above, the voltage is applied to the patch electrodes 108 and they are arranged in the same manner.

By equally controlling the voltage applied to the reflecting elements arranged diagonally among the four reflecting elements or their patch electrodes, the combination of the voltages Va and Vb is applied in both the row and column directions, and the reflection characteristics of the intelligent reflecting surface 100 for horizontal and vertical polarization can be easily equalized. Furthermore, a high phase difference can be set in the intelligent reflecting surface 100 if the voltage to be applied is a combination of the voltages Vz and Vb.

3-3. Control of Reflection Direction-3

Referring to FIG. 9, the driving method of the intelligent reflecting surface 100 that controls the reflection direction in the direction (diagonal direction) spanning the column direction (X-axis direction) and the row direction (Y-axis direction) is described. The difference from the driving method shown in FIG. 7 is that the arrangement of the plurality of the reflecting elements 102 belonging to the second region 138 differs by one column per row. The same or similar configuration to the driving method shown in FIG. 7 may be omitted from the description.

The plurality of second regions 138 in each row are arranged in a different column from the second region 138 in the next row. In the plurality of second regions 138 arranged in adjacent rows, the plurality of reflecting elements 102 to which the voltage Va is applied are arranged diagonally. In the plurality of second regions 138 arranged in adjacent rows, the plurality of reflecting elements 102 to which the voltage Vb is applied are arranged diagonally. In the plurality of second regions 138 arranged in adjacent rows, the plurality of reflecting elements 102 to which the voltage Va or the voltage Vb is applied can be arranged in the same column.

Specifically, as shown in FIG. 9, the second region 138 in row R1 is arranged in columns C6 and C7, and the second region 138 in row R2 adjacent to row R1 is arranged in columns C7 and C8. Of the plurality of reflecting elements in the second region 138 arranged in row R1, the reflecting element arranged in column C6 is applied with the voltage V5, and of the plurality of reflecting elements in the second region 138 arranged in row R2, the reflecting element arranged in column C7 is applied with the voltage V5. Therefore, the reflecting element arranged in column C6 of row R1 and the reflecting element arranged in column C7 of row R2 described above are arranged diagonally. In FIG. 9, the second region 138 is shown with reflecting elements surrounded by dashed lines.

As shown in FIG. 9, the reflecting element arranged in column C7 of the plurality of reflecting elements in the second region 138 arranged in row R1 is applied with the voltage V6, and the reflecting elements arranged in column C8 of the plurality of reflecting elements in the second region 138 arranged in row R2 are applied with the voltage V6. Thus, the reflecting elements arranged in column C7 of row R1 and the reflecting elements arranged in column C8 of row R2 described above are arranged diagonally.

With respect to the patch electrodes 108 that comprise the reflecting element 102 described above, the voltage is applied to the patch electrodes 108 and they are arranged in the same manner.

Thus, the arrangement of the plurality of reflecting elements 102 belonging to the second region 138 differs by one column per row, which allows the reflection direction to be controlled in a diagonal direction with respect to the row and column directions along which the reflecting elements are arranged. Furthermore, the plurality of the reflecting elements 102 to which the same voltage of the plurality of reflecting elements belonging to the second region 138 is applied are arranged diagonally, which allows the intelligent reflecting surface 100 to set a high phase difference.

As described above, the method of driving the intelligent reflecting surface 100 of one embodiment of the invention which has a first region 136 that controls the phase difference for each row and a second region 138 that controls the phase difference for every two columns, and a plurality of reflecting elements 102 in the second region 138 are applied with a voltage Va and a voltage Vb greater than the absolute value of the voltage Va respectively, can be applied to set a high phase difference, thereby widening the variable range of the reflection phase of the intelligent reflecting surface 100. In the plurality of reflecting elements 102 belonging to the second region 138 provided in the same column, by applying the same voltage Va or voltage Vb to the reflecting elements 102 arranged diagonally, the intelligent reflecting surface 100 can exhibit equal reflection characteristics for horizontal and vertical polarization.

The methods of driving the intelligent reflecting surface 100 exemplified as an embodiment of the present invention can be combined as appropriate as long as they do not contradict each other. Also, based on the method of driving the intelligent reflecting surface 100 disclosed in the specification and the drawings, any addition, deletion, or design change of components, or any addition, omission, or change of conditions of the processes as appropriate by a person skilled in the art is also included in the scope of the present invention, as long as it has the gist of the present invention.

It is understood that other advantageous effects different from the advantageous effects disposed by the embodiments disclosed herein, which are obvious from the description herein or which can be easily foreseen by a person skilled in the art, will naturally be disposed by the present invention.

What is claimed is:

1. A driving method of an intelligent reflecting surface having a plurality of reflecting elements arranged in a matrix, the method comprising:

dividing the plurality of reflecting elements arranged in the matrix into a first region that controls an amount of phase change for each column of the plurality of reflecting elements arranged in a column direction and a second region that controls an amount of phase change for every two adjacent columns of a plurality of reflecting elements arranged in the column direction, and driving each of the plurality of reflecting elements belonging to the first region and the second region simultaneously.

2. The method according to claim 1, wherein the amount of phase change controlled by the plurality of reflecting elements belonging to the second region is greater than the amount of phase change controlled by the plurality of reflecting elements belonging to the first region.

3. The method according to claim 1, wherein the plurality of reflecting elements belonging to the first region and the second region each have a patch electrode, a common electrode overlapping the back side of the patch electrode, and a liquid crystal layer between the patch electrode and the common electrode, voltages (V0) to (Vn) are applied to the plurality of patch electrodes of the plurality of reflecting elements belonging to the first region, respectively, a voltage of a combination of voltages (Va) and (Vb) is applied to each of the plurality of patch electrodes of the plurality of reflecting elements belonging to the second region, respectively, (n) is a natural number greater than or equal to 3, an absolute value of the voltage (Vb) is greater than an absolute value of the voltage (Va), and an absolute value of the voltage (Vn) is greater than the absolute value of the voltage (Va).

4. The method according to claim 3, wherein in the plurality of patch electrodes, a first patch electrode to which the voltage (Vn) is applied and a second patch electrode to which the voltage (Va) is applied are arranged along a row direction, and in the plurality of patch electrodes, a third patch electrode to which the voltage (Vb) is applied and the second patch electrode to which the voltage (Va) is applied are arranged along the row direction.

5. The method according to claim 3, wherein the plurality of patch electrodes to which the voltage (Va) is applied are arranged diagonally.

6. The method according to claim 3, wherein the plurality of patch electrodes to which the voltage (Vb) is applied are arranged diagonally.

* * * * *